(12) United States Patent
Kaneko (10) Patent No.: US 7,631,326 B2
(45) Date of Patent: Dec. 8, 2009

(54) SYNCHRONIZATION MECHANISM FOR MULTIMEDIA CAPTIONING AND AUDIO DESCRIPTION

(75) Inventor: Masahiko Kaneko, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1241 days.

(21) Appl. No.: 10/330,422

(22) Filed: Dec. 26, 2002

(65) Prior Publication Data

US 2004/0128702 A1 Jul. 1, 2004

(51) Int. Cl.
H04N 7/16 (2006.01)
H04N 7/10 (2006.01)
(52) U.S. Cl. .................................. 725/32; 725/137
(58) Field of Classification Search .......... 725/25, 725/112, 136, 32, 42, 137; 348/62
See application file for complete search history.

(56) References Cited

U.S. PATENT DOCUMENTS

| | | | | |
|---|---|---|---|---|
| 6,240,555 | B1 * | 5/2001 | Shoff et al. | 725/110 |
| 6,393,158 | B1 * | 5/2002 | Gould et al. | 382/254 |
| 6,460,180 | B1 * | 10/2002 | Park et al. | 725/40 |
| 6,483,568 | B1 * | 11/2002 | Folio | 352/20 |

(Continued)

FOREIGN PATENT DOCUMENTS

JP 2000 253312 A 9/2000

(Continued)

OTHER PUBLICATIONS

Noldus, L.P.J.J., et al., "The Observer Video-Pro: New Software for the Collection, Management, and Presentation of Time-Structured Data From Videotapes and Digital Media Files," *Behavior Research Methods, Instruments, & Computers 2000*, 32(1):197-206.

(Continued)

*Primary Examiner*—Brian T Pendleton
*Assistant Examiner*—Jean D Saint Cyr
(74) *Attorney, Agent, or Firm*—Workman Nydegger (57) ABSTRACT

A method for outputting supplemental media streams with a main media stream is presented. The method monitors for triggering events and, upon detecting a triggering event, causes one or more supplemental media streams associated with the triggering event to output. The associated supplemental media streams may be output either synchronously or asynchronously with the main media stream. Synchronous supplemental media streams are output concurrently with the main media stream. Asynchronously output supplemental media streams suspend the main media stream while they are output and terminate any currently outputting supplemental media streams. A supplemental media stream may cause a conditional triggering event to trigger a second supplemental media stream to output synchronously with the first. A second main media stream with associated supplemental media streams may be output asynchronously as a compiled supplemental media stream in connection with a first main media stream.

31 Claims, 10 Drawing Sheets

U.S. PATENT DOCUMENTS

| | | | |
|---|---|---|---|
| 6,493,291 B2* | 12/2002 | Nagano | 369/7 |
| 6,615,270 B2* | 9/2003 | Gould et al. | 709/231 |
| 6,621,980 B1 | 9/2003 | Gould et al. | |
| 6,637,032 B1* | 10/2003 | Feinleib | 725/110 |
| 6,698,020 B1* | 2/2004 | Zigmond et al. | 725/34 |
| 7,100,193 B2* | 8/2006 | Hassell et al. | 725/136 |
| 7,376,414 B2* | 5/2008 | Engstrom | 455/414.3 |
| 2001/0001160 A1* | 5/2001 | Shoff et al. | 725/51 |
| 2002/0007493 A1* | 1/2002 | Butler et al. | 725/109 |
| 2002/0042920 A1* | 4/2002 | Thomas et al. | 725/87 |
| 2002/0048448 A1* | 4/2002 | Daniels | 386/40 |
| 2002/0174430 A1* | 11/2002 | Ellis et al. | 725/46 |
| 2003/0070169 A1* | 4/2003 | Beyers et al. | 725/51 |
| 2008/0184297 A1* | 7/2008 | Ellis et al. | 725/39 |

FOREIGN PATENT DOCUMENTS

| | | |
|---|---|---|
| JP | 2000 278622 A | 10/2000 |
| WO | WO 95/12275 A | 5/1995 |

OTHER PUBLICATIONS

Babaguchi, N., et al, "Event Based Indexing of Broadcasted Sports Video by Intermodal Collaboration," *IEEE Transactions on Multimedia* 4(1):68-75, Mar. 2002.

Suzuki, T., et al., "Enhancement of VCML Player," *IEEE*, 2001, pp. 365-370.

Hoschka, P. (ed.), "Synchronized Multimedia Integration Language (SMIL) 1.0 Specification," *W3C Recommendation*, World Wide Web Consortium, Jun. 15, 1998, <http://www.w3.org/TR/REC-smil-19980615> [retrieved Nov. 22, 2002].

"RealSystem Release 8," *Real Text Authoring Guide*, RealNetworks, Inc., Dec. 15, 2000, <http://service.real.com/help/library/guides/realtext/htmfiles/notice.htm> [retrieved Nov. 15, 2002].

* cited by examiner

SYNCHRONIZATION MECHANISM FOR MULTIMEDIA CAPTIONING AND AUDIO DESCRIPTION

FIELD OF THE INVENTION

The present invention relates to a method for displaying supplemental media streams designed to assist visually and hearing impaired people in conjunction with a main multimedia stream.

BACKGROUND OF THE INVENTION

There are many people that have access to multimedia but are unable to fully appreciate the content delivered by the multimedia due to impairments to of one of their senses, such as sight or hearing. For example, a person that is hearing impaired may have access to a multimedia content stream having both video and audio aspects, yet can only perceive the video aspect of the content. Likewise, visually impaired persons may have access to a multimedia content stream having both video and audio aspects, yet can only perceive the audio aspects of the content.

Captioning is a supplemental media stream useful in assisting those that are hearing impaired, and has been an industry staple for television programs for many years. The notion of captioning has expanded beyond television broadcasts to other platforms, in particular to computer delivered multimedia streams. Companies such as Apple and RealNetworks have products that enable content authors to include supplemental captioning streams with end products using proprietary captioning formats. These formats are generally based on W3C's Synchronized Multimedia Integration Language.

One key drawback of current systems for integrating supplemental media streams with main multimedia streams is that the information needed to adequately supplement a main media stream often cannot keep apace with the main media stream. Due to the nature of the supplemental media streams, presenting all of the information necessary to adequately supplement the main media stream requires more time than the main media stream allows. As a consequence, content authors must selectively omit some information that would otherwise be included in the supplemental stream, in order to keep apace with the main media stream.

As an example of the foregoing problem, captioning typically displays, in textual format, the dialog of the characters on the screen. Sounds of events that occur off-screen that influence the speech of those characters, such as a scream or sounds of a collision in the background, might need to be omitted in order to capture all of the dialog of the present characters. Ideally, there would be a description of the sound that so influences the speech of those characters. But because the dialog of the characters continues, it is often necessary to omit such descriptions. In addition, supplemental media from one scene often "spills over" into the following scene, creating some confusion as to what is currently occurring in the main media stream.

What is needed is a system for supplying supplemental media streams along with a main media stream and selectively pausing the main media stream to permit the supplemental media stream to fully present the content associated with a particular event. Additionally, the system should suspend the timing model of the main media stream upon which the supplemental media streams are based so that the timing of the supplemental media streams are not affected by pauses in the main media stream.

SUMMARY OF THE INVENTION

A method for outputting supplemental media streams with a main media stream is presented. The method monitors for triggering events and, upon detecting a triggering event, causes one or more supplemental media streams associated with the triggering event to output. The associated supplemental media streams may be output either synchronously or asynchronously with the main media stream. Synchronous supplemental media streams are output concurrently with the main media stream. Asynchronously output supplemental media streams suspend the main media stream while they are output and terminate any currently outputting supplemental media streams. A supplemental media stream may cause a conditional triggering event to trigger a second supplemental media stream to output synchronously with the first. A second main media stream with associated supplemental media streams may be output asynchronously as a compiled supplemental media stream in connection with a first main media stream.

As will be readily appreciated from the foregoing summary, the invention provides a new and improved method for outputting supplemental media streams with a main media stream. Accordingly, the method is ideally suited for displaying supplemental media streams designed to assist visually and hearing impaired people in conjunction with a main multimedia stream.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
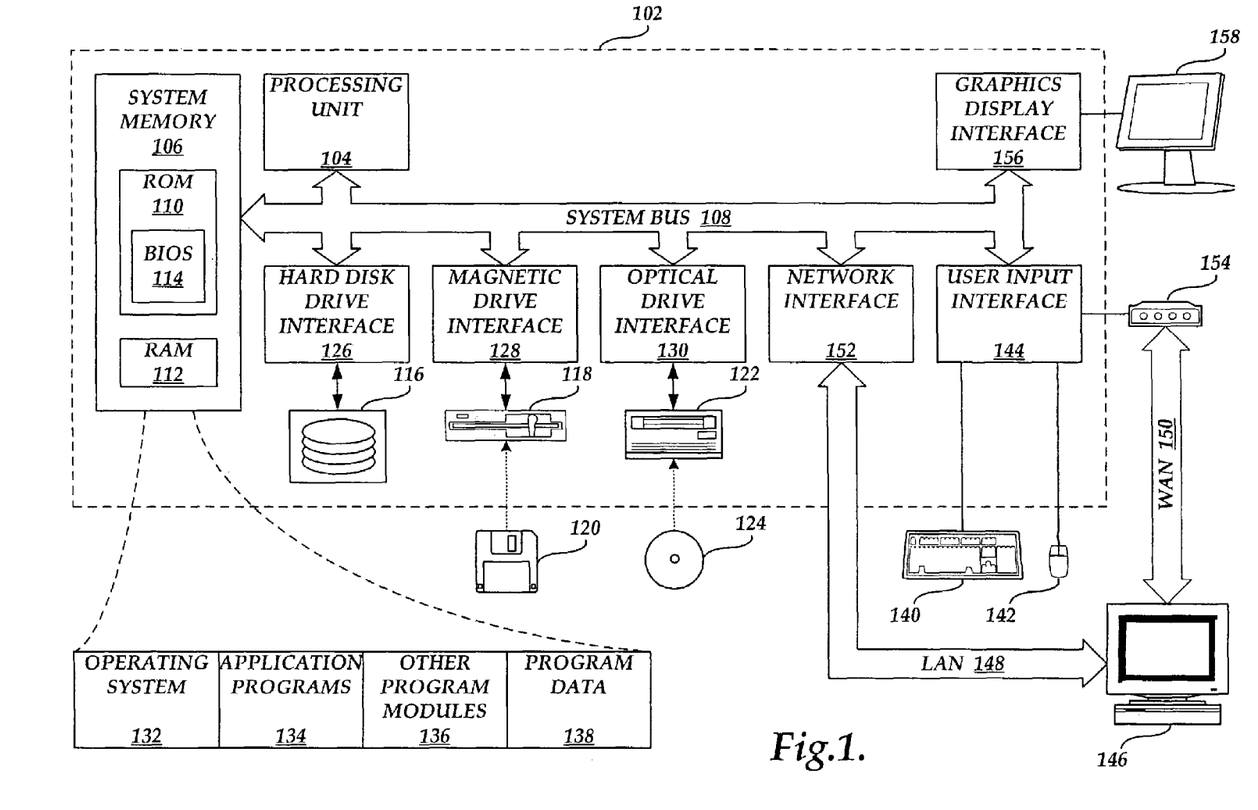
FIG. 1 is a block diagram of a computer system suitable for providing an exemplary operating environment for the present invention.

FIG. 1 and the following discussion are intended to provide a brief, general description of a computing system suitable for implementing various features of the invention. While the computing system will be described in the general context of a personal computer usable in a distributed computing environment, where complimentary tasks are performed by remote computing devices linked together through a communications network, those skilled in the art will appreciate that the invention may be practiced with many other computer system configurations, including multiprocessor systems, minicomputers, mainframe computers, and the like. The invention may be practiced in a local area network or, alternatively, on a single computer using logical, rather than physically remote, devices. Additionally, while the present invention is described in connection with a computer system, it should be understood that the invention may be used in connection with other media stream players such as VCR or DVD players with appropriate control system modifications.

While aspects of the invention may be described in terms of application programs that run on an operating system in conjunction with a personal computer, those skilled in the art will recognize that those aspects also may be implemented in combination with other program modules. Generally, program modules include routines, programs, components, data structures, etc., that perform particular tasks or implement particular abstract data types.

With reference to FIG. 1, an exemplary system for implementing the invention includes a conventional personal computer 102, including a processing unit 104, a system memory 106, and a system bus 108 that couples the system memory to the processing unit 104. The system memory 106 includes read only memory (ROM) 110 and random access memory (RAM) 112. A basic input/output system 114 (BIOS), containing the basic routines that help to transfer information between elements within the personal computer 102, such as during start-up, is stored in ROM 110. The personal computer 102 further includes a hard disk drive 116, a magnetic disk drive 118, e.g., to read from or write to a removable disk 120, and an optical disk drive 122, e.g., for reading a CD-ROM disk 124 or to read from or write to other optical media. The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage for the personal computer 102. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, ZIP disks, and the like, may also be used in the exemplary operating environment.

A number of program modules may be stored in the drives and RAM 112, including an operating system 132, one or more application programs 134, other program modules 136, and program data 138. A user may enter commands and information into the personal computer 102 through input devices such as a keyboard 140 or a mouse 142. Other input devices (not shown) may include a microphone, touchpad, joystick, game pad, satellite dish, scanner, or the like. These and other input devices are often connected to the processing unit 104 through a user input interface 144 that is coupled to the system bus, but may be connected by other interfaces (not shown), such as a game port or a universal serial bus (USB). A display device 158 is also connected to the system bus 108 via a display subsystem that typically includes a graphics display interface 156 and a code module, sometimes referred to as a display driver, to interface with the graphics display interface. In addition, personal computers also typically include other peripheral output devices (not shown), such as speakers or printers.

The personal computer 102 may operate in a networked environment using logical connections to one or more remote computers, such as a remote computer 146. The remote computer 146 may be a server, a router, a peer device or other common network node, and typically includes many or all of the elements described relative to the personal computer 102. The logical connections depicted in FIG. 1 include a local area network (LAN) 148 and a wide area network (WAN) 150. Such networking environments are commonplace in offices, enterprise-wide computer networks, intranets and the Internet.

When used in a LAN networking environment, the personal computer 102 is connected to the LAN 148 through a network interface 152. When used in a WAN networking environment, the personal computer 102 typically includes a modem 154 or other means for establishing communications over the WAN 150, such as the Internet. The modem 154, which may be internal or external, is connected to the system bus 108 via the user input interface 144. In a networked environment, program modules depicted relative to the personal computer 102, or portions thereof, may be stored in the remote memory storage device. It will be appreciated that the network connections shown are exemplary and other means of establishing a communications link between the computers may be used. In addition, the LAN 148 and WAN 150 may be used as a source of nonvolatile storage for the system.

Figure 2:
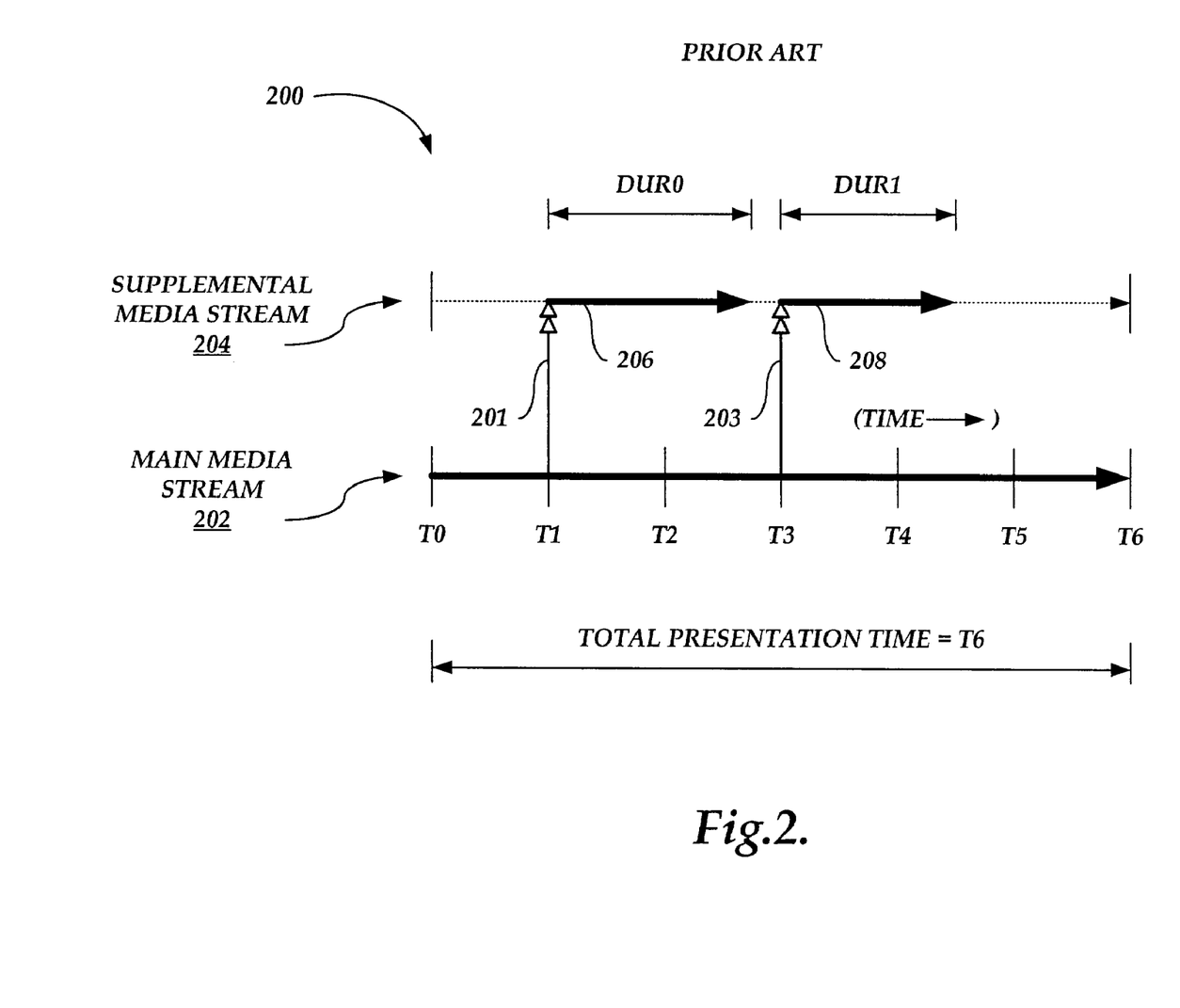
FIG. 2 is a timing diagram illustrative of a supplemental media stream output synchronously with a main media stream as found in the prior art.

FIG. 2 is a timing diagram 200 illustrative of a supplemental media stream 204 output synchronously with a main media stream 202 as found in the prior art. As shown in the timing diagram 200, the main media stream 202 begins output at time T0 and continues uninterrupted to time T6. During output of the main media stream 202, at time T1, a triggering event 201 occurs that causes the supplemental media stream 204 to output a media segment 206. As can be seen from the timing diagram 200, the media segment 206 is output synchronously with the main media stream 202 for a duration of time, DUR0.

At time T3, a second triggering event 203 occurs, causing the supplemental media stream 204 to output a second media segment 208. As found in the prior art, the media segment 208 is also output synchronously with the main media stream 202. As shown in FIG. 2, the media segment 208 outputs for a duration of time, DUR1. Because both media segments are output synchronously with the main media stream 202, the total presentation time of both the main media stream 202 with the associated supplemental media stream 204 is T6, the same as the presentation time for the main media stream alone.

As an example of how this timing diagram 200 operates in the prior art, the main media stream 202 may represent a multimedia presentation to be displayed on a display device, such as display device 156 (FIG. 1.) The supplemental media stream 204 may represent a stream of textual descriptions of dialog occurring in the multimedia presentation. Triggering events 201 and 203 represent predetermined times with respect to the multimedia presentation where dialog occurs or has occurred and a textual description of that dialog is available for hearing impaired people. As found in the prior art, the textual descriptions are displayed synchronously with the multimedia presentation. However, while synchronously presenting the main media stream and a supplemental media stream is adequate when the textual descriptions are sufficiently short to be presented concurrently with the main media stream, it is easy to see how this system would degrade.

For instance, when textual descriptions are long, they may overlap with subsequent scenes of information in the main presentation, creating significant confusion to those who rely on the textual descriptions. Alternatively, the author of the supplemental media stream may be forced to edit out significant information in order to make the textual description "fit" within a specific period of time. As previously discussed, what is needed is a method for pausing the main media stream, when necessary, to allow supplemental media streams to display more robust content within the timing sequence of the main media stream.

Figure 3:
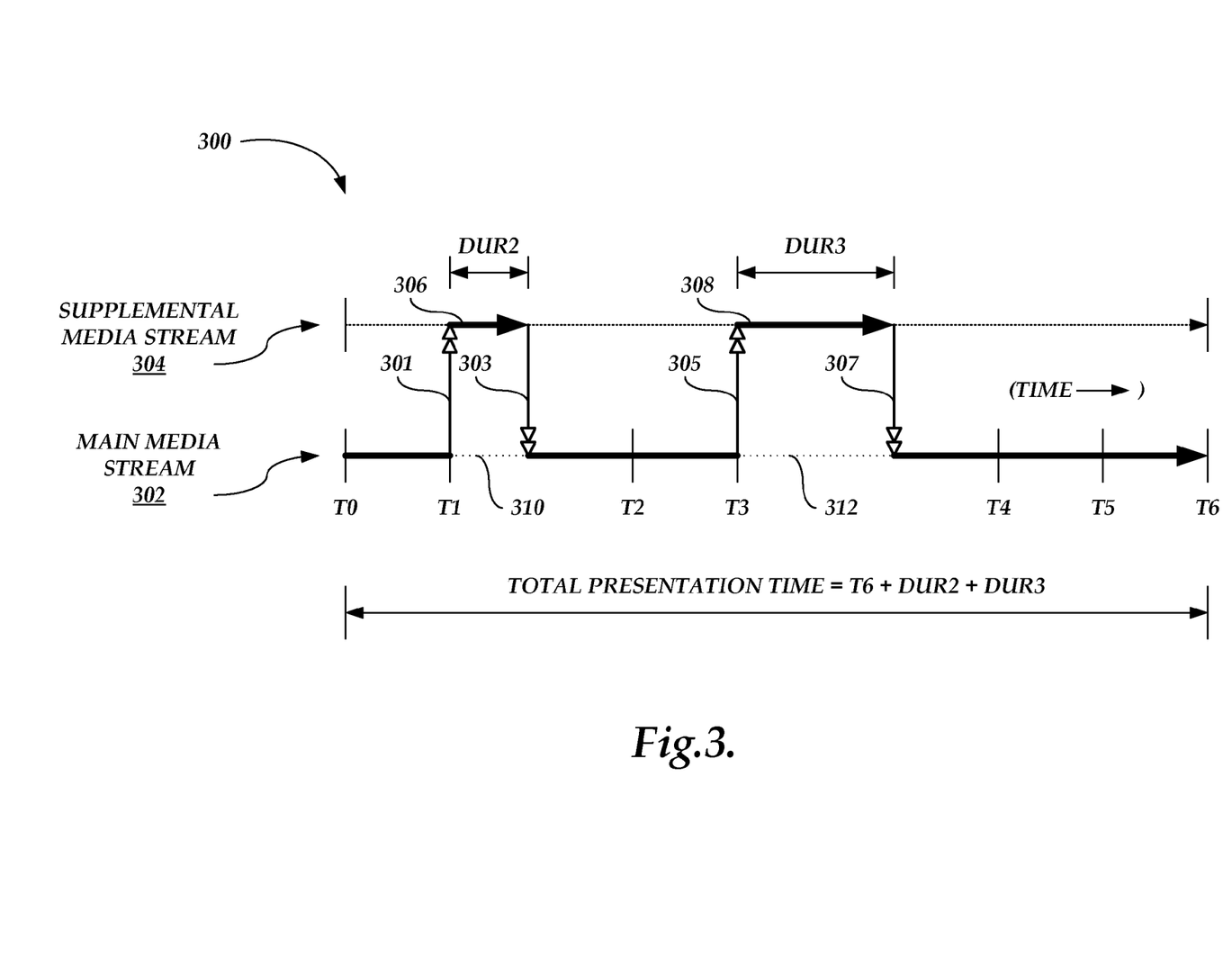
FIG. 3 is a timing diagram illustrative of a supplemental media stream output asynchronously with a main media stream in accordance with the present invention.

FIG. 3 is a timing diagram 300 illustrative of a supplemental media stream 304 output asynchronously with a main media stream 302 in accordance with the present invention. As shown in the timing diagram 300, the main media stream 302 begins output at time T0 and terminates at time T6. During output of the main media stream 302, at time T1, a triggering event 301 occurs that causes the supplemental media stream 304 to output a media segment 306. However, unlike the synchronous output of the supplemental media segments in FIG. 2, the media segment 306 is output asynchronously to the main media stream 302. Accordingly, the main media stream 302 is suspended, as indicated by pause segment 310. The information for determining whether a main media stream should be suspended may be determined from the triggering event, from the type of supplemental media segment, or internally determined by the supplemental media segment. However, the present invention should not be construed as limited to any particular mechanism for determining whether to output a supplemental media stream asynchronously with a main media stream.

As shown in the timing diagram 300, the media segment 306 outputs for a duration of time, DUR2. During this period of time, the main media stream 302 remains suspended, including the timing of the main media stream. When the media segment 306 is completed, triggering event 303 occurs causing the main media stream 302, and its timing, to resume. The triggering event may be generated by the media segment 306 itself, by the supplemental media stream 304, or by an external monitoring system. However, the present invention should not be construed as limited to any particular mechanism for resuming a suspended main media stream 302.

At time T3, a triggering event 305 causes the supplemental media stream 304 to output another media segment 308 asynchronously to main media stream 302. The media segment 308 outputs for a duration of time, DUR3, during which the main media stream 302 is suspended, as indicated by pause segment 312. After the media segment 308 has terminated, or alternatively, as a terminating act, a triggering event 307 causes the main media stream 302 to resume its output. According to the illustrative timing diagram 300, thereafter the main media continues its output uninterrupted to termination at time T6. However, while the output time for the main media stream 302 is T6, the total presentation time for outputting both the main media stream and the supplemental media stream 304 is T6+DUR2+DUR3, due to the suspensions of time for the asynchronous output of media segments 306 and 308.

By asynchronously outputting segments of a supplemental media stream, as shown in timing diagram 300, content providers are not limited in the quantity or quality of supplemental information that can be presented with the main media stream. Additionally, the supplemental information may be presented in a more timely and coordinated manner with the main media stream.

Figure 4:
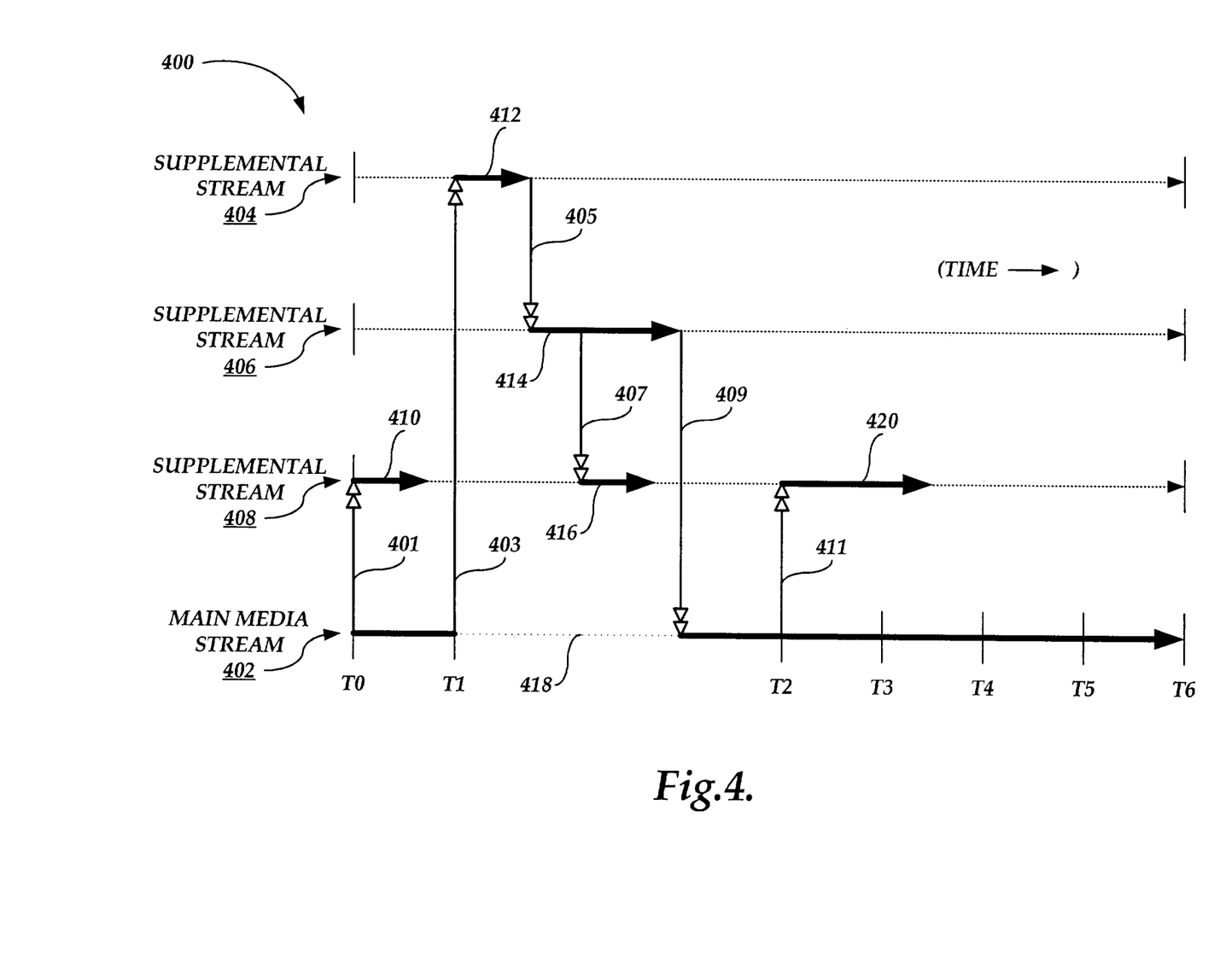
FIG. 4 is a timing diagram illustrative of multiple supplemental media streams output both synchronously and asynchronously with a main media stream in accordance with the present invention.

FIG. 4 is a timing diagram 400 illustrative of multiple supplemental media streams output both synchronously and asynchronously with a main media stream 402 in accordance with the present invention. Beginning at time T0, the main media stream 402 commences its output. Also at time T0, a triggering event 401 causes supplemental media stream 408 to output a media segment 410 synchronously with the main media stream 402. Because the media segment 410 is output synchronously with the main media stream 402, media segment does not affect the total presentation time of the main media stream and the supplemental media streams.

Often there may be multiple supplemental media streams associated with a single triggering event. According to the present invention, these associated supplemental media streams may be output either synchronously or asynchronously with the main media stream. Because asynchronous supplemental media streams pause all other streams, when there are multiple asynchronous supplemental media streams associated with a single triggering event, an order for outputting the associated streams may be necessary. For instance, a content author may deem it necessary to output a first supplemental media stream before outputting a second supplemental media stream, and that both segments should be output prior to resuming output of the main media stream. According to aspects of the present invention, the highest priority supplemental media stream is output first. Additionally, when the first supplemental media stream completes it's output of a media segment associated with the triggering event, it causes a second associated media stream to output a supplemental media segment. According to one aspect of the present invention, this may be accomplished by the first supplemental media segment forwarding the triggering event to a second supplemental media segment. Alternatively, the first supplemental media segment may cause a second triggering event to occur that causes the second associated supplement media stream to output a media segment. However, the present invention should not be construed as limited to any particular mechanism for iteratively outputting a plurality of supplemental media streams associated with a single triggering event. When all associated asynchronous supplemental media streams have completed, any synchronous media segments may be output and the main media stream is resumed.

According to the illustrative timing diagram 400, at time T1, supplemental media stream 404 and supplemental media stream 406 are both associated with the triggering event 403. According to a predetermined order, the triggering event 403 causes the supplemental media stream 404 to begin outputting its media segment 412. Because media segment 412 is to be output asynchronously, the main media stream 402 is paused, as indicated by pause segment 418. As the media segment 412 terminates, triggering event 405 causes the supplemental media stream 406 to output media segment 414.

There are many instances where a content author may wish to conditionally output a second supplemental media stream concurrently with a first supplemental media stream. For instance, if a hearing impaired viewer has indicated an ability to understand sign language, a content author may wish to conditionally output a signing supplemental media segment along with the textual description of the main media stream. Under such circumstances, the textual description supplemental media stream may test an external condition to determine whether concurrently outputting an associated sign language supplemental media stream is appropriate. Alternatively, a conditional triggering event may occur and the conditional supplemental media segment may itself determine whether to be output based on the external condition.

As shown in FIG. 4, the media segment 414 is output asynchronously to the main media stream 402. However, during output of the media segment 414, a conditional triggering event to occurs, as illustrated by conditional triggering event 407. Initiated by the conditional triggering event 407, the supplemental media stream outputs media segment 416 synchronously with the media segment 414. According to the illustrative timing diagram 400, the conditional media segment,416 terminates prior to the media segment 414. As the media segment 414 terminates, because it is output asynchronously to the main media stream 402, and because there are no other supplemental media streams associated with the triggering event 403, a triggering event 409 causes the main media stream to resume output. At time T2, a triggering event 411 occurs causing the supplemental media stream 408 to synchronously output media segment 420.

According to other aspects of the present invention (not shown), if a supplemental media stream is outputting when a triggering event causes a second asynchronous supplemental media stream to output, the first supplemental media stream is truncated/terminated. For example, if the media segment 410 were sufficiently long to execute until time T2, it would be truncated/terminated at time T1 because the media segment 412 is output asynchronously. Alternatively, supplemental media streams may continue being output after a subsequent triggering event if the second supplement media segment 410 is to be output synchronously. Thus, according to the example just described, the media segment 410 would continue to be output after triggering event 403 occurred if the media segment 412 were to be output synchronously as well.

Figure 5:
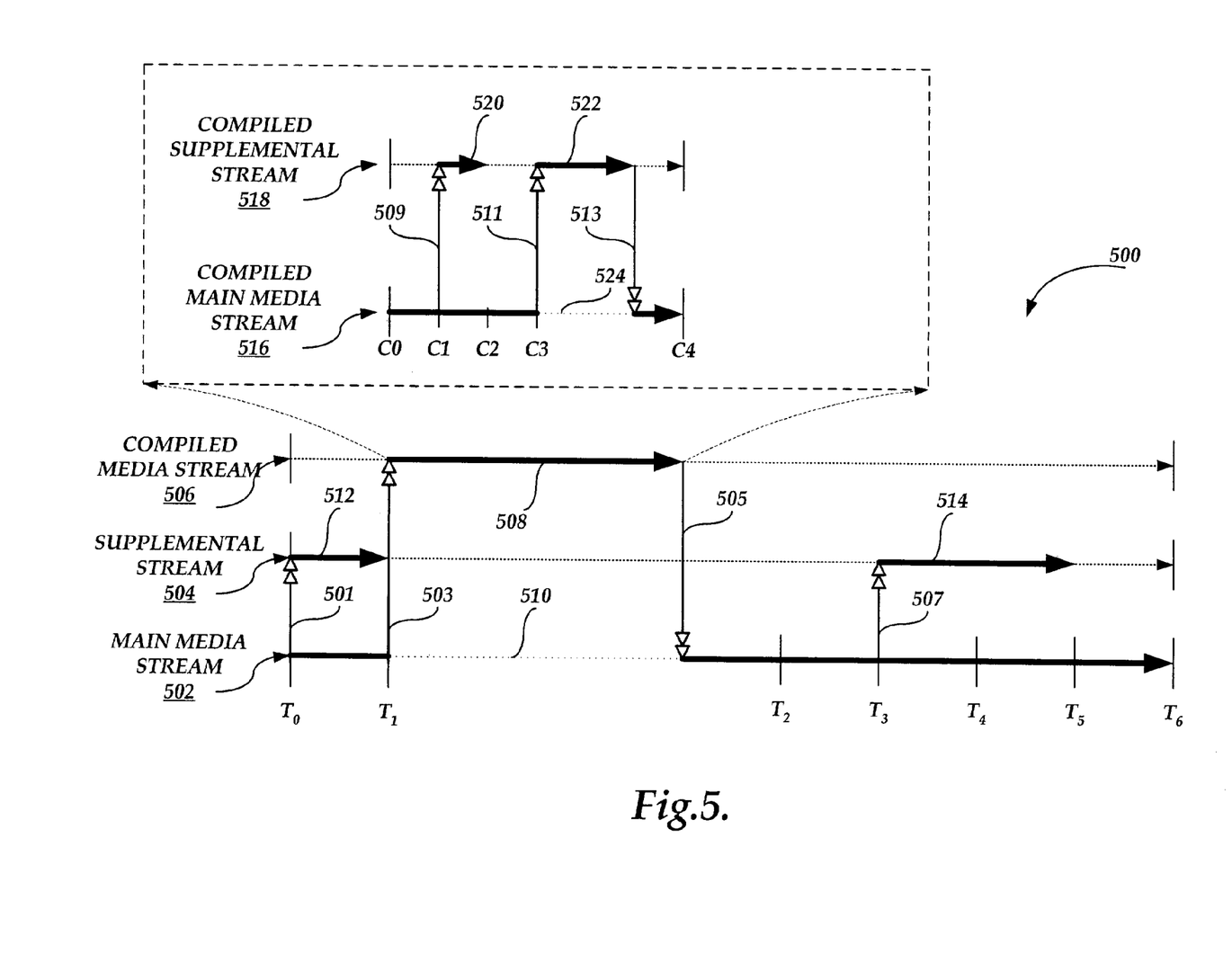
FIG. 5 is a timing diagram illustrative of multiple supplemental media streams, including a compiled supplemental media stream, output both synchronously and asynchronously with a main media stream in accordance with the present invention.

Another advantage realized by the present invention over the prior art is the ability to use a compilation of a main media stream and supplemental media streams as a compiled media stream to a second main media stream. The compiled media stream uses its own timing internally, and associated supplemental media streams may be output asynchronously to the compiled main media stream. FIG. 5 illustrates the use of a compiled supplemental media stream.

FIG. 5 is a timing diagram 500 illustrative of multiple supplemental media streams, including a compiled media stream 506, output both synchronously and asynchronously with a main media stream 502 in accordance with the present invention. Beginning at time T0, the main media stream is output. Additionally, at time T0, the triggering event 501 causes a supplemental media stream 504 to synchronously output a supplemental media segment 512. At time T1, the triggering event 503 causes the compiled media stream 506 to output the compiled media segment 508 asynchronously, as illustrated by the pause segment 510. As shown in FIG. 5, the compiled media segment 508 comprises a compiled main media stream 516 and a compiled supplement media stream 518.

According to the timing diagram 500, at time C0, which corresponds to time T1 of the main media stream 502, the compiled main media stream 516 is output. At time C1, the triggering event 509 causes the compiled supplemental media stream 518 to synchronously output the compiled media segment 520. At time C3, the triggering event 511 causes the compiled supplemental media stream 518 to asynchronously output the compiled media segment 522. Because the compiled media segment 522 is output asynchronously, the compiled main media stream 516 is suspended, as indicated by pause segment 524. Upon completion of the compiled media segment 522, the triggering event 513 causes the compiled main media stream 516 to resume. At time C4, the compiled main media stream 516 terminates. The termination of the compiled main media stream 516 signifies the termination of the compiled media segment 508. Accordingly, a triggering event 505 occurs that causes the main media stream 502 to resume its output. At time T3, a triggering event 507 occurs that causes the supplemental media stream 504 to synchronously output the media segment 514.

Figure 6:
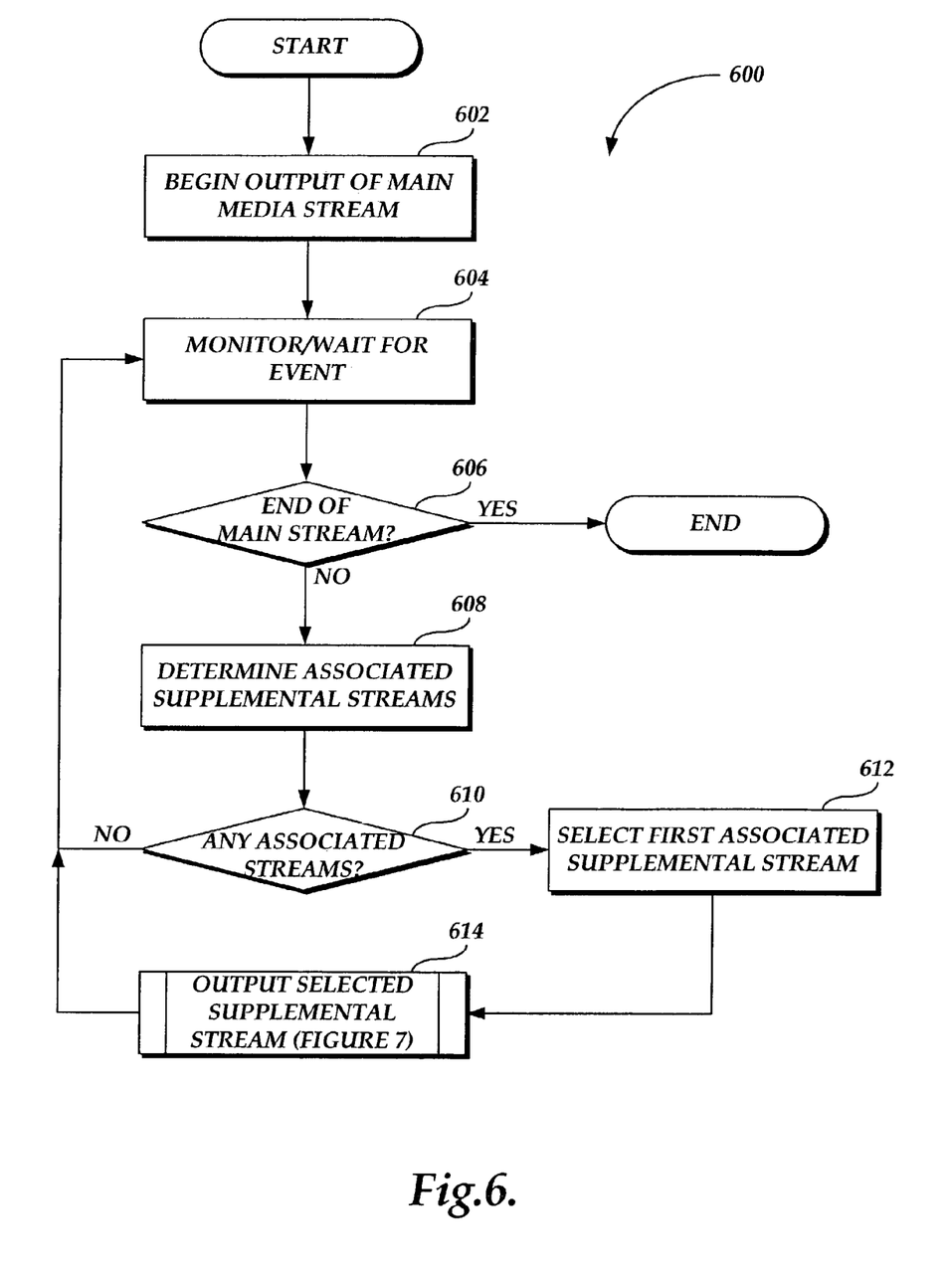
FIG. 6 is a flow diagram illustrative of an exemplary output media stream routine for outputting a main media stream and supplemental media streams in accordance with the present invention.

FIG. 6 is a flow diagram illustrative of an exemplary output media stream routine 600 for outputting a main media stream with one or more supplemental media streams in accordance with the present invention. Beginning at block 602, the main media stream is output. Those skilled in the art will recognize that the main media stream will continue to be output while the exemplary routine 600 continues. Accordingly, while the main media stream is output, at block 604, the routine 600 waits/monitors for an event to occur, either a triggering event or an event signifying the end of the main media stream. After receiving an event, at decision block 606 a determination is made whether the event was an event signifying the end of the main media stream. If the event did signify the end of the main media stream, the routine 600 terminates.

If, at decision block 606, the event did not signify the end of the main media stream, the event was a triggering event for supplemental media streams. At block 608, a determination is made identifying those supplemental media streams associated with the triggering event. At decision block 610, a determination is made whether there are any associated supplemental media streams that have not been output. If there are more supplemental media streams to process, at block 612 the next associated supplemental media stream is selected. As previously discussed, a predetermined order for outputting the supplemental media streams may be established. Alternatively, selection of associated supplemental media streams may be based on priority values of each associated supplemental media stream, or individual supplemental media segments. Those skilled in the art will recognize that there are many different manners of selecting among associated supplemental media streams, and the present invention should not be construed as limited to those described herein for illustrative purposes.

At block 614 an output supplemental media stream subroutine is called to output the selected supplemental media stream. A more detailed description of this subroutine is described in regard to FIGS. 7A, 7B, and 7C.

Figure 7A:
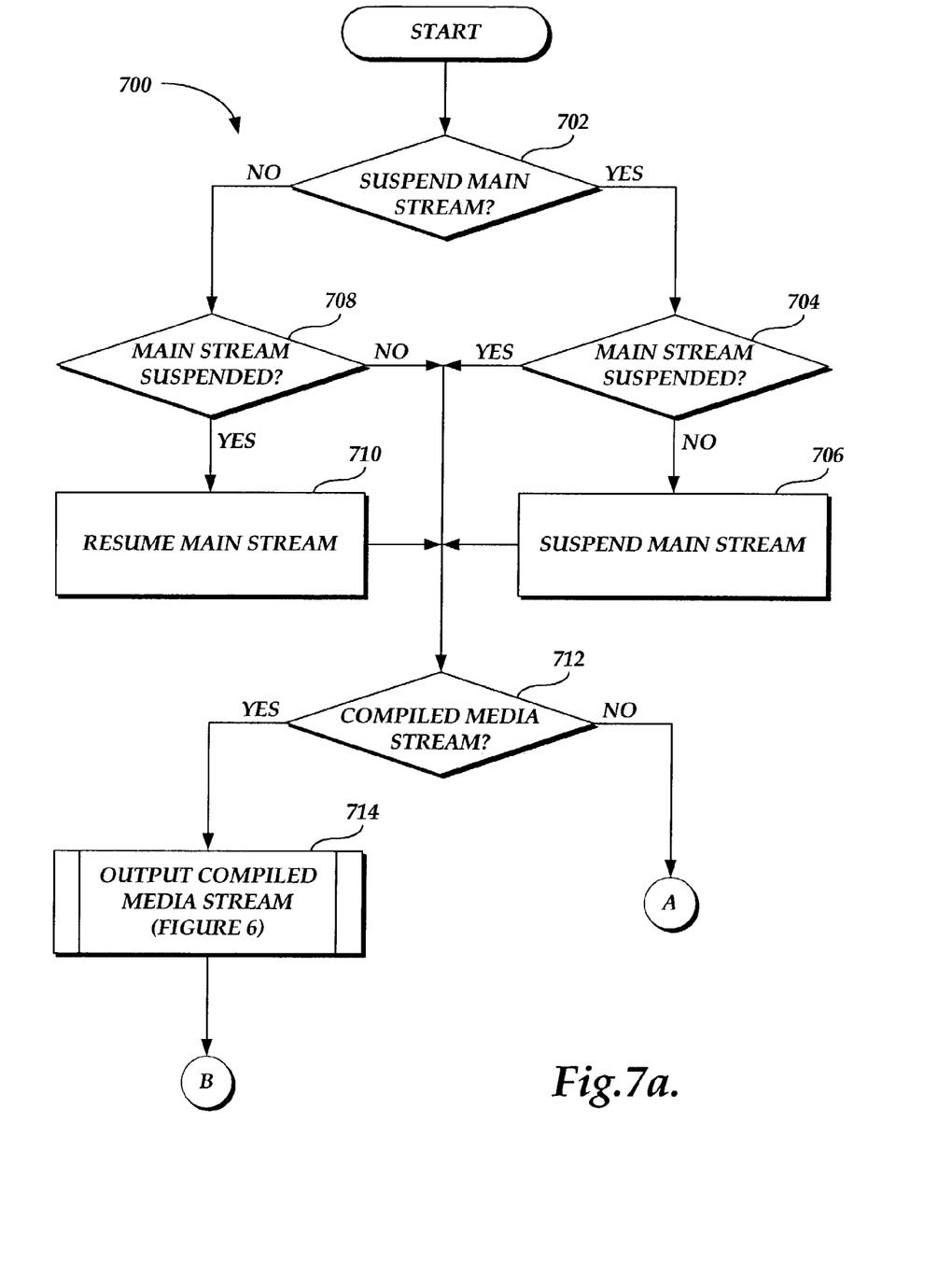
FIGS. 7A, 7B, and 7C are a flow diagram illustrative of an output supplemental stream subroutine for use in the exemplary output media stream routine shown in FIG. 6.
Figure 7B:
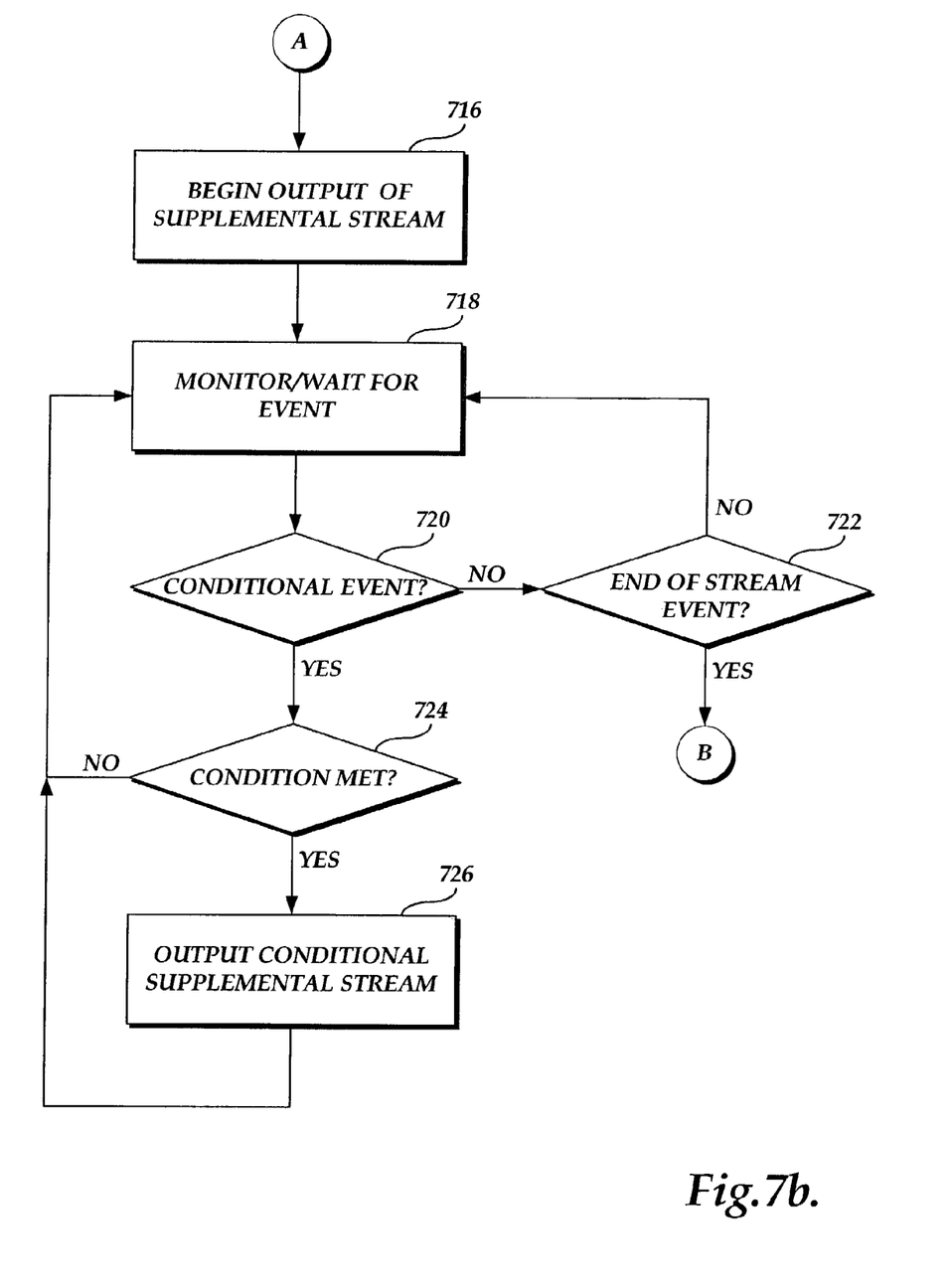
Figure 7C:
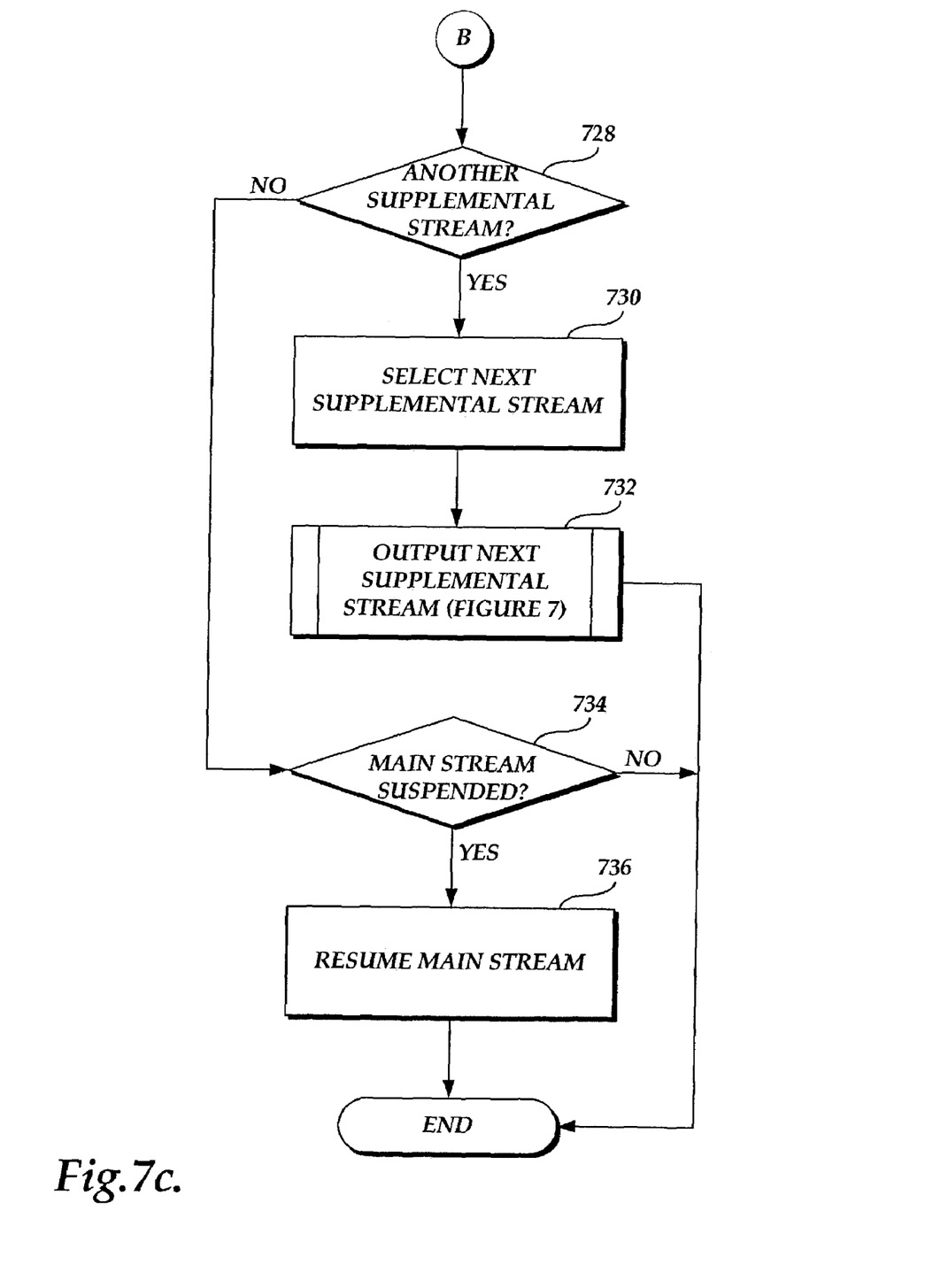

FIGS. 7A, 7B, and 7C are a flow diagram illustrative of an output supplemental media stream subroutine 700 for use in the exemplary output media stream routine 600 shown in FIG. 6. Beginning at block 702 (FIG. 7A), a determination is made where the main media stream is to be suspended, i.e., whether the supplemental media stream is to be output synchronously or asynchronously. If the main media stream is to be suspended, at decision block 704 a determination is made whether the main media stream is already suspended. If the main media stream is not already suspended (as would likely be the case if this subroutine 700 were called to output the first associated supplemental media stream), at block 706 the main media stream is suspended. Thereafter, the subroutine 700 proceeds to decision block 712. Alternatively, if, at decision block 704, the main media stream is already suspended, the subroutine 700 proceeds directly to decision block 712.

If, at decision block 702, the main media stream is not to be suspended, at decision block 708, a determination is made whether the main stream is currently suspended. If the main media stream is suspended (as may be the case if this subroutine 700 were called to output a second associated supplemental media stream), at block 710 the main media stream is resumed. Thereafter, the subroutine 700 proceeds to decision block 712. Alternatively, if, at decision block 708, the main media stream is not suspended, the subroutine 700 proceeds directly to decision block 712.

At decision block 712, a determination is made whether the supplemental media stream is a compiled media stream. If the supplemental media stream is a compiled media stream, at block 714, the compiled media stream is output. According to the illustrated subroutine 700, the output media stream routine 600 (FIG. 6) is recursively called to output the compiled media stream. After outputting the compiled media stream, the subroutine 700 proceeds to decision block 728 (FIG. 7C).

If, at decision block 712, the supplemental media stream is not a compiled media stream, at block 716 (FIG. 7B) the supplemental media stream is output. While the supplemental media stream is output, at block 718, the subroutine 700 monitors/waits for a conditional event to occur, or alternatively, for an event signifying the supplemental media stream has completed its output. At decision block 720, a determination is made whether the event detected was a conditional event. If the event was not a conditional event, at block 722 a determination is made whether the event signified the supplemental media stream completed its output. If the supplemental media stream did not complete its output, the subroutine 700 returns again to block 718 to monitor/wait for another event. However, if the event did signify that the supplemental media stream completed its output, the subroutine 700 proceeds to decision block 728 (FIG. 7C).

Alternatively, if, at decision block 720, the event was a conditional event, at decision block 724, a determination is made whether the condition is met. If the condition is met, at block 726, the conditional supplemental media stream is output. Thereafter, the process returns again to block 718 to monitor/wait for another event. However, if a decision block 724, the condition is not met, the conditional event is ignored and the process returns to block 718 to monitor/wait for another event.

At decision block 728 (FIG. 7C), a determination is made whether there are any additional supplemental media streams associated with the triggering event. If there are additional associated supplemental media streams, at block 730 the next supplemental stream is output by recursively by calling this output supplemental stream subroutine 700. Thereafter, the subroutine 700 terminates. Alternatively, if, at decision block 728, there are no more associated supplemental media streams, at decision block 734 a determination is made whether the main media stream is suspended. If the main media stream is suspended, at block 736 the main stream is resumed. Thereafter the subroutine 700 terminates. However, if at decision block 734 the main media stream is not suspended, the subroutine 700 terminates.

Figure 8:
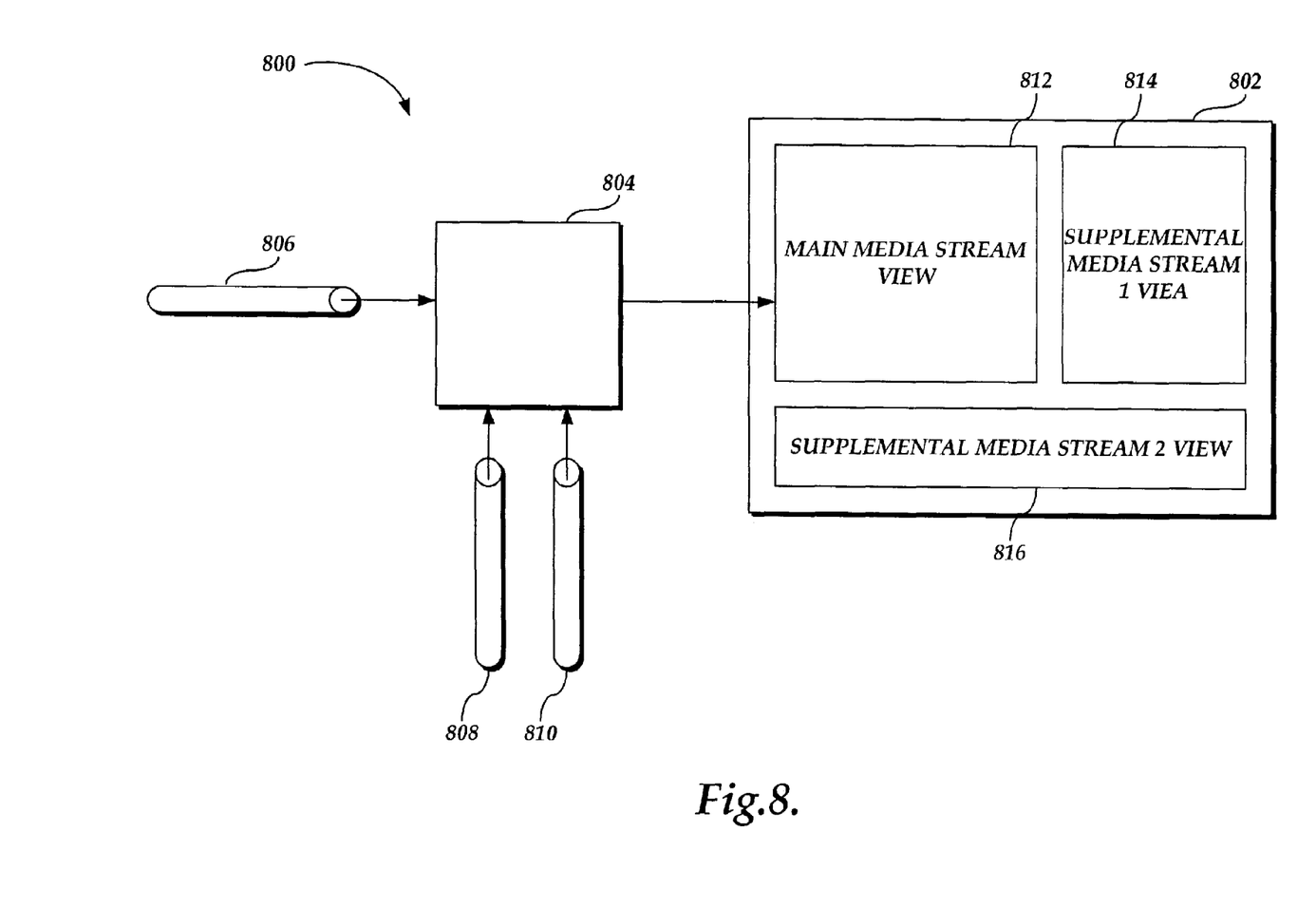
FIG. 8 is a block diagram illustrating an exemplary output media system formed in accordance with the present invention.

FIG. 8 is a block diagram illustrating an exemplary output media system 800 formed in accordance with the present invention. The system includes a media stream output device 802 for outputting a main media stream and one or more supplemental media streams. While this diagram may show only visual representations of the media streams, it is for illustration purposes only and should not be construed as limiting upon the present invention. According to one embodiment, the media stream output device 802 is capable of outputting both visual and audio media streams. Additionally, media stream output device 802 may be comprised of multiple components, such as a display device and speakers.

According to the illustrated example, the media stream output device 802 is connected to a media stream output controller 804. The media stream output controller 804 obtains the main media stream 806 and associated supplemental media streams 808 and 810, and directs them to the media output device 802. According to the illustrated example, the media stream output device 802 outputs the main media stream 806 in the display view 812, while the supplemental media streams 808 and 810 are displayed in the supplemental display views 814 and 816. As shown in the illustrated example, the supplemental media streams 808 and 810 are not displayed in the same display view. However, according to other embodiments, these streams may be display in the same supplemental display view. Additionally, according to the illustrated example, the main media stream 806 and supplemental media streams 808 and 810 are shown as separate streams entering the media stream output controller 804. However, this is for illustration purposes only, and should not be construed as limiting upon the present invention. According to one embodiment, the main media stream and supplemental media streams are obtained by the media stream output controller 804 as a single stream. While the preferred embodiment of the invention has been illustrated and described, it will be appreciated that various changes can he made therein without departing from the spirit and scope of the invention.

The embodiments of the invention in which an exclusive property or privilege is claimed are defined as follows:

1. A method for outputting one or more supplemental media streams designed to assist sense impaired people in conjunction with a main media stream, comprising:
   outputting a main media stream on a display device;
   repeatedly monitoring for and detecting triggering events while outputting the main media stream; and
   upon detecting a triggering event:
      determining which of the one or more supplemental media streams are associated with the triggering event;
      determining for each associated supplemental media stream whether each associated supplemental media stream is to be output synchronously or asynchronously with the main media stream, wherein the determination whether to output each associated supplemental media stream synchronously or asynchronously is made automatically without user intervention based on information provided in either the triggering event or each supplemental media stream; and
   iteratively outputting each associated supplemental media stream either synchronously or asynchronously with the main media stream according to the results of the previous determinations such that upon determining that a supplemental media stream is to be output asynchronously with the main media stream, the output of the main media stream is automatically suspended without user intervention while the supplemental media stream is output on the display device.

2. The method of claim 1, further comprising determining a plurality of supplemental media streams associated with the triggering event and wherein the plurality of associated supplemental media streams are iteratively output according to a predetermined order among the associated supplemental media streams.

3. The method of claim 2, wherein the predetermined order among associated supplemental media streams is established according to priority values associated with each supplemental media stream.

4. The method of claim 1, further comprising terminating a second supplemental media stream currently being output when the associated supplemental media stream is output asynchronously.

5. The method of claim 1, further comprising resuming output of the main media stream after asynchronously outputting the associated supplemental media stream.

6. The method of claim 5, wherein the triggering events occur according to the timing of the main media stream.

7. The method of claim 6, wherein the timing of the main media stream is suspended when the main media stream is suspended.

8. The method of claim 1, wherein a first associated supplemental media stream iteratively causes a second associated supplemental media stream to output when the first associated supplemental media stream terminates its output.

9. The method of claim 1, wherein an associated supplemental media stream issues a conditional triggering event that causes a conditional supplemental media stream to output synchronously with the associated supplemental media stream.

10. The method of claim 9, wherein the associated supplemental media stream selectively issues the conditional triggering event according to a condition external to the associated supplemental media stream.

11. The method of claim 1, wherein determining which of the one or more supplemental media streams are associated with the triggering event comprises selectively excluding, according to an external condition, a supplemental media stream that would otherwise be associated with the triggering event.

12. The method of claim 11, wherein the external condition identifies the type of supplemental media stream to be selectively excluded.

13. The method of claim 1, wherein a supplemental media stream comprises either an audio description stream, a visual description stream, or a compiled media stream.

14. The method of claim 13, wherein a compiled media stream comprises a compiled main media stream and one or more compiled supplemental media streams associated with the compiled media stream.

15. The method of claim 14, wherein outputting a compiled media stream comprises:

repeatedly monitoring for and detecting compiled triggering events while outputting the compiled main media stream; and upon detecting a compiled triggering event:

determining which of the one or more compiled supplemental media streams are associated with the compiled triggering event;

determining for each associated compiled supplemental media stream whether each associated compiled supplemental media stream is to be output synchronously or asynchronously with the compiled main media stream; and iteratively outputting each associated compiled supplemental media stream either synchronously or asynchronously with the compiled main media stream in accordance with the results of the previous determinations such that upon determining that a compiled supplemental media stream is to be output asynchronously with the main media stream, the output of the main media stream is automatically suspended without user intervention while the compiled supplemental media stream is output.

16. The method of claim 15, wherein a compiled supplemental media stream comprises either an audio description stream, a visual description stream, or a compiled media stream.

17. The method of claim 15, wherein the compiled triggering events occur according to the timing of the compiled main media stream.

18. A computer readable storage medium having computer executable instructions for carrying out the method comprising the steps of:

outputting a main media stream;

repeatedly monitoring for and detecting triggering events while outputting the main media stream; and upon detecting a triggering event:

determining which of one or more supplemental media streams are associated with the triggering event;

determining for each associated supplemental media stream whether each associated supplemental media stream is to be output synchronously or asynchronously with the main media stream, wherein the determination whether to output each associated supplemental media stream synchronously or asynchronously is made automatically without user intervention based on information provided in either the triggering event or each supplemental media stream; and iteratively outputting each associated supplemental media stream either synchronously or asynchronously with the main media stream according to the results of the previous determinations to a display device for display on said device such that upon determining that a supplemental media stream is to be output asynchronously with the main media stream, the output of the main media stream is automatically suspended without user intervention while the supplemental media stream is output.

19. The computer readable storage medium of claim 18, wherein a supplemental media stream comprises either an audio description stream, a visual description stream, or a compiled media stream, a compiled media stream comprising a compiled main media stream and one or more compiled supplemental media streams associated with the compiled media stream, and outputting a compiled media stream comprises:

repeatedly monitoring for and detecting compiled triggering events while outputting the compiled main media stream; and upon detecting a compiled triggering event:

determining which of the one or more compiled supplemental media streams are associated with the compiled triggering event;

determining for each associated compiled supplemental media stream whether each associated compiled supplemental media stream is to be output synchronously or asynchronously with the compiled main media stream; and iteratively outputting each associated compiled supplemental media stream either synchronously or asynchronously with the compiled main media stream in accordance with the results of the previous determinations such that upon determining that a compiled supplemental media stream is to be output asynchronously with the main media stream, the output of the main media stream is automatically suspended without user intervention while the compiled supplemental media stream is output.

20. A system for outputting at least one supplemental media stream designed to assist sense impaired people in conjunction with a main media stream, the system comprising:

a media stream output device for outputting a main media stream and at least one supplemental media stream, wherein the at least one supplemental media stream comprises captioning that displays in textual format either dialog of characters that are being displayed in the main media stream or sounds of events that occur in the main media stream; and a media stream output controller communicatively coupled to the media stream output device for:

receiving a main media stream and at least one supplemental media stream;

outputting the main media stream via the media stream output device;

monitoring for and detecting triggering events associated with the output of the main media stream; and upon detecting a triggering event:

determining which of the at least one supplemental media streams are associated with the detected triggering event;

determining for each associated supplemental media stream whether each associated supplemental media stream is to be output synchronously or asynchronously with the main media stream, wherein the determination whether to output each associated supplemental media stream synchronously or asynchronously is made automatically without user intervention based on information provided in either the triggering event or each supplemental media stream; and iteratively outputting each associated supplemental media stream, via the media stream output device, either synchronously or asynchronously with the main media stream in accordance with the results of the previous determinations such that upon determining that a supplemental media stream is to be output asynchronously with the main media stream, the output of the main media stream is automatically suspended without user-intervention while the supplemental media stream is output.

21. The system of claim 20, wherein the associated supplemental media streams are iteratively output according to a predetermined order among the associated supplemental media streams.

22. The system of claim 21, wherein the predetermined order among the associated supplemental media streams is established according to priority values assigned to each supplemental media stream.

23. The system of claim 20, wherein the media stream output controller is further for terminating a second supplemental media stream currently being output when the associated supplemental media stream is output asynchronously.

24. The system of claim 20, wherein the media stream output controller is further for resuming output of the main media stream after asynchronously outputting the associated supplemental media stream.

25. The system of claim 20, wherein a first associated supplemental media stream iteratively causes a second associated supplemental media stream to output when the first associated supplemental media stream terminates its output.

26. The system of claim 20, wherein an associated supplemental media stream issues a conditional triggering event that causes a conditional supplemental media stream to output synchronously with the associated supplemental media stream.

27. The system of claim 26, wherein the associated supplemental media stream selectively issues the conditional triggering event according to a condition external to the associated supplemental media stream.

28. The system of claim 20, wherein a supplemental media stream comprises an audio description stream, a visual description stream, or a compiled media stream.

29. The system of claim 28, wherein a compiled media stream comprises a compiled main media stream and at least one compiled supplemental media stream associated with the compiled media stream.

30. A media display system for outputting one or more supplemental media streams designed to assist sense impaired people in conjunction with outputting a main media stream, the system comprising:

a monitoring means for monitoring and detecting triggering events associated while outputting the main media stream;

a supplemental media stream selection means for selecting which of the one or more supplemental media streams are associated with a detected triggering event;

a determination means for determining for each associated supplemental media stream whether each associated supplemental media stream is to be output synchronously or asynchronously with the main media stream, wherein the determination whether to output each associated supplemental media stream synchronously or asynchronously is made automatically without user intervention based on information provided in either the triggering event or each supplemental media stream;

a control means for iteratively outputting each associated supplemental media stream either synchronously or asynchronously with the main media stream according to the results of the determinations by the determination means, terminating any currently outputting supplemental media streams when an associated supplemental media stream is output asynchronously, and suspending the main media stream while the associated supplemental media stream is output asynchronously such that upon the control means determining that a supplemental media stream is to be output asynchronously with the main media stream, the output of the main media stream is automatically suspended without user intervention while the supplemental media stream is output; and a display means for displaying the media streams.

31. The method of claim 1 wherein the main media stream is a stream comprising video data and audio data and wherein the supplemental media streams comprise closed-captioning text, and wherein automatically suspending the main media stream comprises pausing the video and audio of the main media stream such that the closed-captioning text of the supplemental data stream to be output asynchronously is displayed together with the paused video data of the main media stream.

\* \* \* \* \*